US011009370B2

(12) United States Patent
Grozinger et al.

(10) Patent No.: US 11,009,370 B2
(45) Date of Patent: May 18, 2021

(54) METHOD AND SAFETY CIRCUIT FOR SAFE LIMITING OF ELECTRICAL POWER CONSUMPTION

(71) Applicant: Endress+Hauser SE+Co. KG, Maulburg (DE)

(72) Inventors: Roland Grozinger, Neuenburg (DE); Edwin Steinebrunner, Todtnau (DE)

(73) Assignee: Endress+Hauser SE+Co. KG, Maulburg (DE)

( * ) Notice: Subject to any disclaimer, the term of this patent is extended or adjusted under 35 U.S.C. 154(b) by 295 days.

(21) Appl. No.: 16/318,418

(22) PCT Filed: Jun. 26, 2017

(86) PCT No.: PCT/EP2017/065655
§ 371 (c)(1),
(2) Date: Jan. 17, 2019

(87) PCT Pub. No.: WO2018/015107
PCT Pub. Date: Jan. 25, 2018

(65) Prior Publication Data
US 2019/0293452 A1 Sep. 26, 2019

(30) Foreign Application Priority Data
Jul. 19, 2016 (DE) ...................... 10 2016 113 268.3

(51) Int. Cl.
*H02H 3/00* (2006.01)
*G01D 3/08* (2006.01)
(Continued)

(52) U.S. Cl.
CPC ............. *G01D 3/08* (2013.01); *G01F 23/284* (2013.01); *G01K 3/005* (2013.01); *H02H 9/008* (2013.01)

(58) Field of Classification Search
None
See application file for complete search history.

(56) References Cited

U.S. PATENT DOCUMENTS 5,583,420 A * 12/1996 Rice ........................ F02N 11/04
322/25
9,343,971 B2 * 5/2016 Yedevelly ......... H02M 3/33507
(Continued)

FOREIGN PATENT DOCUMENTS

CN          103250034 A    8/2013
CN          103391816 A   11/2013
(Continued)

OTHER PUBLICATIONS

Search Report for German Patent Application No. 10 2016 113 268.3, German Patent Office, dated Jul. 18, 2017, 5 pp.
(Continued)

*Primary Examiner* — Stephen W Jackson
(74) *Attorney, Agent, or Firm* — Mark A. Logan; Endress+Hauser (USA) Holding Inc.

(57) ABSTRACT

The invention relates to a method and to a safety circuit for safe limiting of consumption of electrical power in an electrical component of a field device. The consumption of the electrical power is controlled by separating the input path from a superordinated unit by the safety circuit according to a predetermined clocking, wherein the clocking is controlled by a control signal. In the case of no control signal, the power limiting is assured by separating the input path from the superordinated unit. In the case of a defective control signal, the power is limited by the safety circuit to a maximum power. Due to this type of control, the operating temperature of the electrical component remains always below a critical temperature. The field device may thus be used in explosion-endangered regions.

8 Claims, 3 Drawing Sheets

(51) Int. Cl.
*G01K 3/00* (2006.01)
*H02H 9/00* (2006.01)
*G01F 23/284* (2006.01)

(56) References Cited

U.S. PATENT DOCUMENTS

2015/0364944 A1  12/2015  Garcia Briz et al.
2016/0178397 A1  6/2016  Jost et al.

FOREIGN PATENT DOCUMENTS

| | | |
|---|---|---|
| CN | 105191041 A | 12/2015 |
| DE | 10328532 B3 | 12/2004 |
| DE | 102006056175 A1 | 5/2008 |
| DE | 102010040833 A1 | 3/2012 |
| DE | 102013104139 A1 | 10/2014 |
| DE | 102014110385 A1 | 1/2016 |
| EP | 2154381 A2 | 2/2010 |
| WO | 2012034796 A2 | 3/2012 |
| WO | 2013110296 A1 | 8/2013 |

OTHER PUBLICATIONS

International Search Report for Patent Application No. PCT/EP2017/065655, WIPO, dated Aug. 22, 2017, 12 pp.

* cited by examiner

METHOD AND SAFETY CIRCUIT FOR SAFE LIMITING OF ELECTRICAL POWER CONSUMPTION

CROSS-REFERENCE TO RELATED APPLICATIONS

The present application is related to and claims the priority benefit of German Patent Application No. 10 2016 113 268.3, filed on Jul. 19, 2016 and International Patent Application No. PCT/EP2017/065655, filed on Jun. 26, 2017 the entire contents of which are incorporated herein by reference.

TECHNICAL FIELD

The invention relates to a method and safety circuit for safe limiting of electrical power consumption in an electrical component of a field device.

BACKGROUND

In automation technology, especially in process automation technology, field devices are often applied, which serve for registering and/or for influencing process variables. Used for registering process variables are sensors, which are integrated, for example, in fill-level measuring devices, flow measuring devices, pressure- and temperature measuring devices, pH-redox potential measuring devices, conductivity measuring devices, etc. They register the corresponding process variables, fill level, flow, pressure, temperature, pH-value, redox potential and conductivity. Serving for influencing process variables are actuators, such as, among others, valves or pumps, via which the flow of a medium in a pipeline section or the fill level in a container can be changed. In the context of the invention, the terminology, container, means also non-closed containments, such as, for example, basins, lakes and flowing bodies of water. In general, all devices are referred to as field devices, which are applied near to the process and which deliver, or process, process relevant information. Therefore, in connection with the invention, the terminology, field devices, means supplementally also remote I/Os, radio adapters, and, generally, electronic components, which are arranged at the field level. A large number of these field devices are produced and sold by the firm, Endress+Hauser.

Since field devices are often used in explosion-endangered regions, such as in oil tanks or under comparable conditions, they must be correspondingly embodied to be explosion safe. The safety specifications in this connection are established for the European space in the standard, IEC/EN 60079. According to this, electrical assemblies of field devices must be so embodied that they cannot ignite the atmosphere of an explosion-endangered region.

Potting encapsulation represents, in such case, a very suitable technical means for explosion safe embodiment of such electrical assemblies. The specification of potting encapsulation necessary for this is set forth in the standard, EN 60079, part 18. Arrangement of the component in a pressure resistant housing forms another measure for explosion protection. The specifications, which the pressure resistant housing must fulfill in this case, are defined in part 1 of the standard, IEC/EN 60079.

Certain assemblies of field devices can, however, not be made safe by potting or a pressure-resistant housing. Especially, the sensor modules of field devices, for example, pressure sensors in the case of pressure measuring devices or the antenna unit of radar based fill-level measuring devices require direct contact with the explosion-endangered region. Therefore, these electricals assemblies must be embodied intrinsically safely (Ex-i). This means that maximum electrical power $P_{e,max}$ supplied to them (or the maximum supplied steady current $I_{max}$) as well as the maximum electrical energy $W_{max}$ stored in them needs to be limited. The limiting must, in such case, be selected such that even at the maximum continuous power $P_{e,max}$, or at discharge of the maximum stored energy $W_{max}$, there is no impermissible heating within the electrical component above a critical temperature $T_{krit}$. The critical temperature $T_{krit}$ is, in such case, that temperature, above which the atmosphere of the explosion-endangered region can be ignited by the electrical component. Intrinsically safe embodiment of electronic assemblies is specified in part 11 of the standard, IEC/EN 60079. The critical temperature $T_{krit}$ depends, in such case, on the gas mixture, which is present, and is divided into different classes in part 1 of the standard, IEC/EN 60079.

Described in the publication WO 2012/034796 A2 is a safety circuit for an intrinsically safe electrical component of a field device. The safety circuit shown there controls the electrical input path, via which the component to be made safe is supplied with power, in such a manner that a heating of the component to be made safe to above the critical temperature $T_{krit}$ is prevented. The control is based on a clocked shorting of the input path to ground. In such case, the maximum transmittable power is set by the timing ratio. This timing ratio and the clocking frequency, with which the safety circuit clocks the electrical input path, is impressed by a superordinated unit.

The safety circuit thus assures that in the case of a defect in the component to be made safe, such is fed under no circumstances more than the maximum allowed average power $P_{e,max}$. However, it is in the case of the safety circuit described in the publication WO 2012/034796 A2 not excluded that upon an incorrect clocking, for example, upon failure of the superordinated unit, the maximum allowed power $P_{e,max}$ is, on average, indeed, not exceeded, however, a lingering power conversion occurs in the safety circuit. In order to prevent this, a synchronous and mutually time-matched clocking is required.

SUMMARY

An object of the invention is, therefore, to provide a method and a safety circuit for safe limiting of power consumption in an electrical component of a field device, wherein the limiting also is assured in the case of failure of superordinated units.

The invention achieves this object with a method for safe limiting of consumption of electrical power ($P_e$) in an electrical component of a field device, wherein the component receives the electrical power ($P_e$) in the context of the invention via an electrical input path from a superordinated unit. The method is characterized by controlling the consumption of the electrical power ($P_e$) by separating the input path from the superordinated unit by a safety circuit according to a predetermined clocking, wherein the clocking is controlled by a control signal ($s_c$) sent to the safety circuit, in the case of no control signal ($s_c$), durably separating the electrical input path from the superordinated unit by the safety circuit, and in the case of a defective control signal ($s_c$), limiting the electrical power ($P_e$) by the safety circuit.

The method of the invention achieves that the power consumption in the electrical component is at least limited or completely interrupted in the case of failure of the superordinated units. In this way, it is prevented that the electrical component is heated to above a critical temperature $T_{krit}$, above which the component could ignite the atmosphere in an explosion-endangered region.

Depending on design of the safety circuit, it is advantageous to implement the control signal ($s_c$), for example, as a sine signal, a sawtooth signal or especially a rectangular signal. In such case, it can, in each case, be a periodic signal form; it can, however, also be produced as an acyclic signal.

The method of the invention can especially advantageously be implemented in a safety circuit that limits the electrical power ($P_e$) in the case of a defective control signal ($s_c$) by separating the input path from the superordinated unit for at least a predefined minimum off time ($t_{off,min}$). In this case, it can be advantageous to consider the control signal ($s_c$) as defective, when it exceeds a predefined maximum clocking frequency ($f_{t,max}$) and/or a predefined maximum on time ($t_{on,max}$). This classification is preferably applied in the case of periodic- and especially in the case of rectangular signals. Above all, in this case, it is advantageous to dimension the minimum off time ($t_{off,min}$) in such a manner that the temperature of the component remains below a critical temperature ($T_{krit}$), above which the atmosphere of an explosion endangered region could be ignited.

In the method of the invention, it is, moreover, advantageous so to design the field device that the control signal ($s_c$) is produced by the same superordinated unit, which also supplies power to the electrical component to be made safe. In this case, the field device has to comprise only one and the same component for these two tasks.

Furthermore, the invention relates to a safety circuit for safe limiting of consumption of electrical power ($P_e$) in an electrical component of a field device, wherein the component receives the electrical power ($P_e$) via an electrical input path from a superordinated unit. For this, the safety circuit comprises:
- at least one switch arranged in the electrical input path for clocked separating of the input path from the superordinated unit (for redundant design, also a plurality of series connected switches could be used),
- a signal input for a control signal ($s_c$), and
- a circuit, which controls the at least one switch in such a manner that the at least one switch
  - separates the input path from the superordinated unit as a function of the control signal ($s_c$) according to a predetermined clocking,
  - in the case of no control signal ($s_c$), durably separates the electrical input path from the superordinated unit, and
  - in the case of a defective control signal ($s_c$), limits the electrical power ($P_e$) by separating the input path from the superordinated unit for at least a predefined minimum off time ($t_{off,min}$).

For this, moreover, a superordinated unit is provided for producing the control signal ($s_c$). In this way, the safety circuit is able to practice the method of the invention for limiting power to a component to be made safe in a field device.

Preferably, the at least one switch and/or the signal input are/is implemented as one or more transistors. Likewise an option would be to provide one or more relays.

In a very robust embodiment of the safety circuit, the circuit includes:
- an amplifier connected as a comparator and having
  - at least a first input for the control signal ($s_c$), and
  - an output, via which the switch is controlled, as well as at least one capacitor.
- In such case, the at least one capacitor is sized and connected between the signal input and the first input in such a manner that the minimum off time ($t_{off,min}$) is at least dependent on the capacitance of the at least one capacitor.

BRIEF DESCRIPTION OF THE DRAWINGS

The invention will now be explained in greater detail based on the appended drawing, the figures of which show as follows.

DETAILED DESCRIPTION

Figure 1:
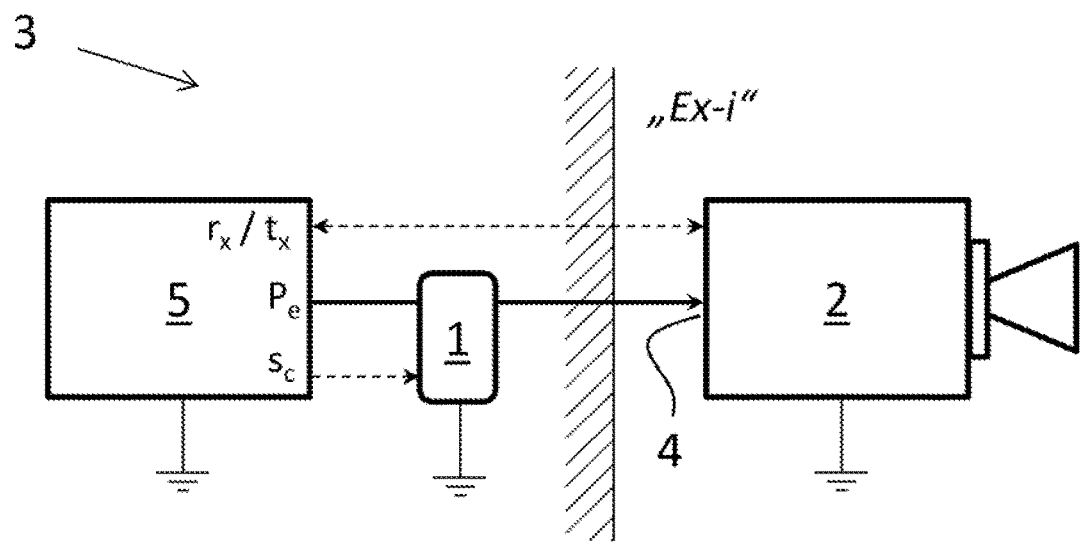
FIG. 1 shows an arrangement of a safety circuit of the invention in a field device.

Based on FIG. 1, the necessity of a safety circuit 1 in a field device 3 and the approximate operation of the safety circuit of the invention 1 will first be illustrated:

Frequently, the field device 3 is applied in explosion endangered regions. For this reason, its electronic components 2, 5 are embodied explosion safely corresponding to the standard, IEC/EN 60079, or the like, since without these safety measures they could potentially act as ignition sources.

The field device 3 in FIG. 1 includes two electrical components 2, 5: on the one hand, it includes a superordinated unit 5, which can serve, for example, for measured value processing or also for communication with a process control system. The superordinated unit 5 does not have to be in direct contact with the explosion-endangered region and can, consequently, be protected by potting encapsulation (for example, according to IEC/EN 60079-18) and/or by a pressure-resistant housing (corresponding to IEC/EN 60079-1).

The situation is different for the case of a second electrical component 2, which includes, for example, pressure sensors for pressure measurement or an antenna unit for radar based fill level measurement and, consequently, must be in direct contact with the explosion-endangered region. Since, in such case, neither potting encapsulation nor pressure resistant encapsulation is possible, the electrical component 2 is embodied to be intrinsically safe ("Ex-i"). In such case, the provided intrinsically safe power $P_e$ can, for the case, in which the component 2 is a very small component, produce a strong heating in such a manner that the critical temperature $T_{krit}$ is exceeded. By limiting the supplied power $P_e$ by clocking, it is assured that the temperature of the component remains below a critical temperature $T_{krit}$, above which an ignition of the atmosphere in the explosion-endangered region could occur.

The electrical component 2 in the case of the field device 3 shown in FIG. 1 is supplied with electrical power $P_e$ by the superordinated unit 5, wherein the power consumption of the electrical component 2 occurs via an input path 4. In such case, the safety circuit 1 is arranged in the input path 4 between the superordinated unit 5 and the electrical component 2. According to the invention, the consumption of electrical power $P_e$ is controlled by separating the electrical input path 4 from the superordinated unit 5 according to a predefined clocking by the safety circuit 1, wherein the clocking is controlled by a control signal $s_c$ sent to the safety circuit 1.

A central aspect of the method of the invention is that the power $P_e$ is at least limited or interrupted in the case of a defective superordinated unit 5. According to the invention, the electrical input path 4 is, consequently, interrupted by the safety circuit 1 in the case of no control signal $s_c$. In the case of a defective control signal $s_c$, the electrical power $P_e$ is limited by the safety circuit 1. In this way, it is assured that upon failure of the superordinated unit 5, in no case is more than a predefined maximum power $P_{e,max}$ transmitted.

Figure 2:
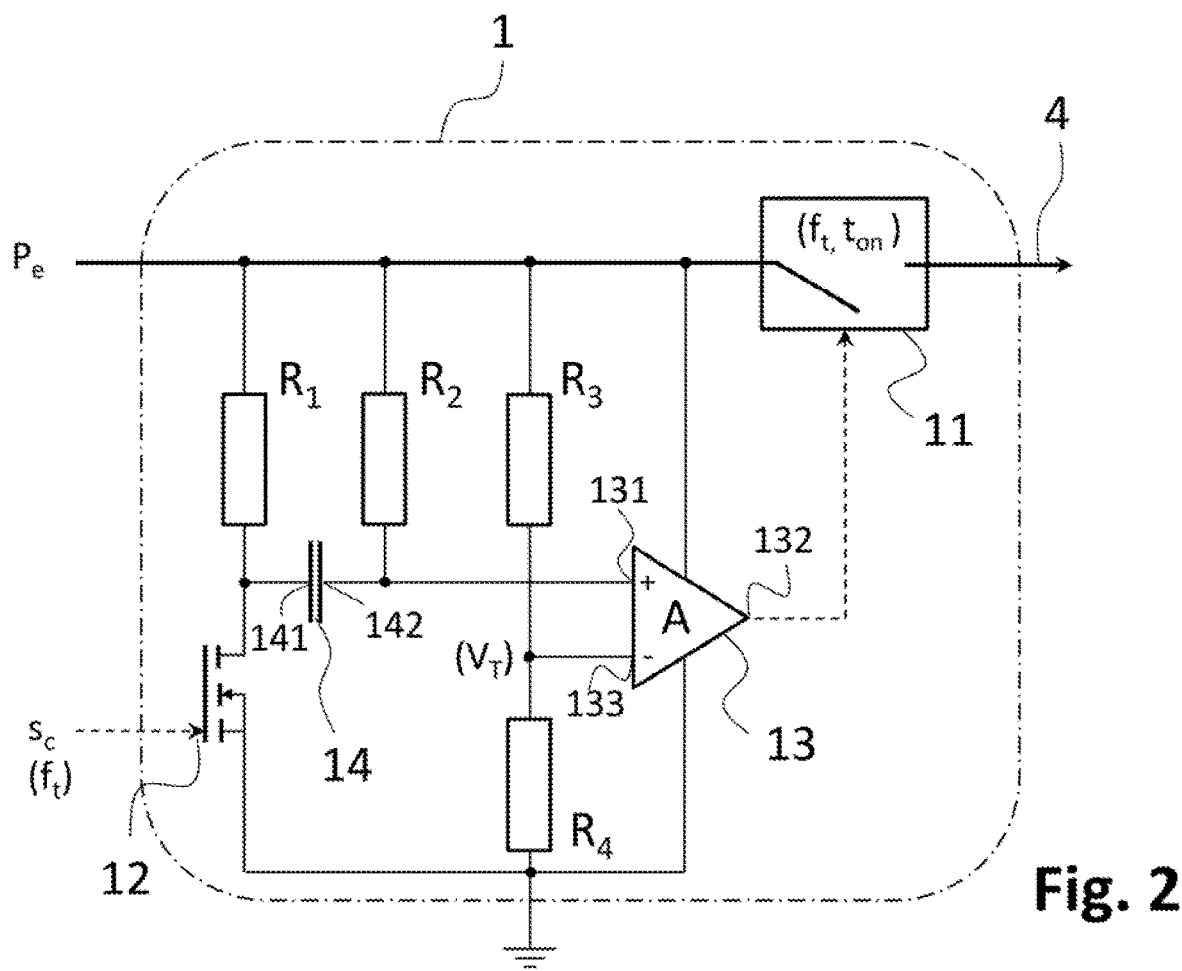
FIG. 2 shows a circuit diagram of an embodiment of the safety circuit.

A possible implementation of the method of the invention in a corresponding safety circuit 1 is shown in FIG. 2. The safety circuit 1 shown there is based on a switch 11, which is arranged in the input path 4 and interrupts such according to a predefined clocking. The operation of this safety circuit 1 can best be explained, when a periodic rectangular signal with predefined clocking frequency $f_t$ and pulse length $t_t$ is applied as control signal $s_c$, as shown in FIGS. 3 to 6. The operation of the safety circuit 1 of the invention is not, however, so limited. Rather, the operation can be equally effective, when the control signal $s_c$ is, for example, a corresponding periodic sawtooth- or sine signal, or an acyclically clocked rectangular- or other signal).

The switch 11 in the illustrated embodiment is implemented as a pnp transistor or as a p-channel MOSFET and is opened and closed via an output 132 of an amplifier 13. The amplifier 13 is, in such case, connected as a comparator. The amplifier 13, in turn, is controlled via a first input 131 indirectly by control signal $s_c$. In this way, the switch 11 is controlled by the clocking of the periodic control signal $s_c$.

The potential on the second amplifier input 133 is set via a voltage divider $R_3$, $R_4$. In this way, a limit voltage $V_T$ is established, which must be subceeded on the first input 131, in order that the output 132 of the amplifier 13 lies low enough and so closes the switch 11. In order that the switch 11 closes, when low potential is present on the first input 131 and so low potential is present on the output 132 of the amplifier 13, switch 11 is embodied as a bipolar pnp transistor or as a p-channel MOSFET (in the case of application of npn transistors, instead of pnp transistors, or n-channel MOSFETs instead of p-channel MOSFETs, correspondingly other level relationships would be used for circuit implementation).

As can be seen from FIG. 2, the control signal $s_c$ is not applied directly to the first input 131 of the amplifier 13. Rather, the control signal $s_c$ controls the gate, or the base, of a signal input 12 embodied as a transistor. By making this transistor 12 conductive by means of the control signal $s_c$, a first connection 141 of a capacitor 14 is drawn to ground, whereby at first in the case of completely discharged capacitor 14 likewise ground potential is present on the second connection 142 of the capacitor. In this way, the potential on the second connection 142, which is connected with the first input 131 of the amplifier 14, sinks for a short time below the limit voltage $V_T$. To the extent that the transistor 12 is implemented as an npn transistor or n-channel MOSFET, the switch 11 is, thus, corresponding to the above described relationships, closed by each positive level of the periodic control signal $s_c$ (in the case of application of npn transistors instead of pnp transistors, or n-channel MOSFETs instead of p-channel MOSFETs, correspondingly other level relationships would be used for circuit implementation).

After the transistor 12 becomes conductive, the potential rises with a time delay, which corresponds to a maximum on time $t_{on,max}$, back above the limit voltage $V_T$. The reason is that the capacitor 14 is charged via a resistor $R_2$, which is arranged between the supply line $P_e$ and the second input 142 of the capacitor 14, and the first input 131 of the amplifier 13. The maximum on time $t_{on,max}$ is thus fixed by the time constant $(R_2*C)$ of the capacitor 14 and the resistor $R_2$.

Figure 3:
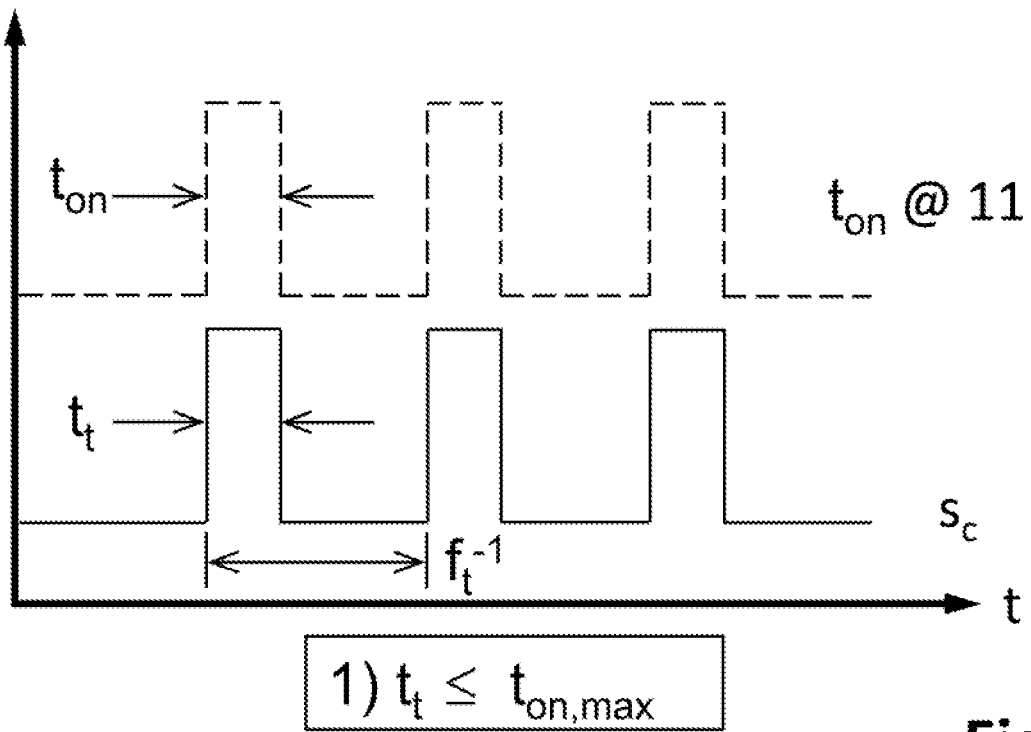
FIG. 3 shows a clocked power limiting of safety circuit in the case of a rectangularly shaped control signal.

If the transistor 12 becomes non-conductive before expiration of the maximum on time $t_{on,max}$, then a higher potential than $V_T$ returns to the first input 131 of the amplifier 13. For this case, the time relationship between a periodic rectangular signal (with a clocking frequency $f_t$ and a pulse length $t_t$) as control signal $s_c$ and the on time $t_{on}$ at the switch 11 is shown in FIG. 3. Corresponding to the above described relationships, it can be seen that at a small clocking frequency $f_t$ and a small pulse length $t_t$ below the maximum on time $t_{on,max}$, the on time $t_{on}$ agrees with the pulse length $t_t$. In this case, the power $P_e$, which is transmitted to the electrical component, is correspondingly $$P_e=P_{on}(f_t*t_{on}).$$

$P_{on}$ is, in such case, the electrical power, which is instantaneously supplied in the case of short-circuited switch 11. Possible power fractions, which, in given cases, reach the electrical component 2 via peripheral inputs, for example, signal inputs $r_x/t_x$, are not taken into consideration here.

Figure 4:
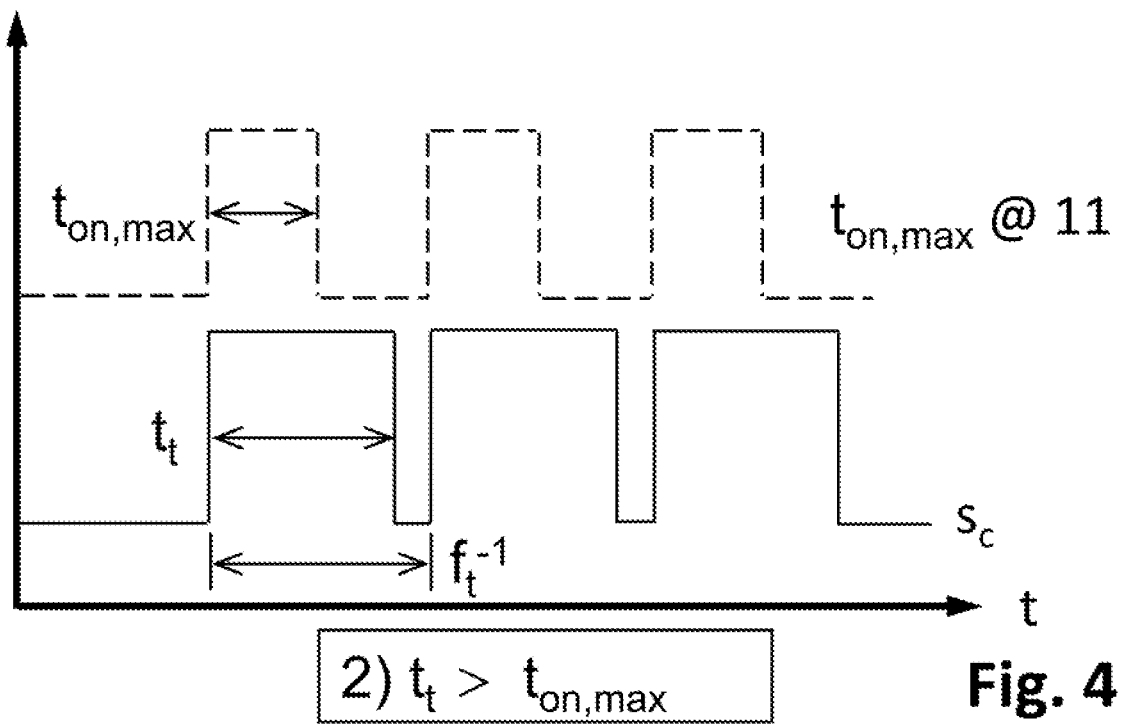
FIG. 4 shows a clocked power limiting in the case of a defective rectangular signal having too much time per clock signal.

As shown in FIG. 4, the situation is different, when the transistor 12 becomes non-conductive after expiration of the maximum on time $t_{on,max}$, i.e. when the pulse length $t_t$ of the control signal $s_c$ because of a defective control by the superordinated unit 5 is longer than the maximum on time $t_{on,max}$. In this case, the switch 11 is, indeed, closed with the frequency $f_t$, however, only for the maximum on time $t_{on,max}$. Thus, the transferred power $P_e$ is correspondingly limited $$P_e=P_{on}(f_t*t_{on,max}).$$

FIGS. 3 and 4 also make clear that the electrical input path 4 is interrupted by the safety circuit 1 in the case of no control signal $s_c$ (or a defectively constant, direct voltage type, control signal $s_c$), since the control signal $s_c$ then has no clocked positive level or a static level and the switch 11 then separates the signal input 4 durably from the superordinated unit 5.

A further error on the part of the superordinated unit 5 can occur, when it produces the control signal $s_c$ defectively with a clocking frequency $f_t$, which is higher than a predefined maximum clocking frequency $f_{t,max}$. In this case, the electrical component 2 would consume prohibitively greater than a pre-known maximum power $P_{e,max}$. In this way, it would be possible that the electrical component 2 would be heated to above the critical temperature $T_{krit}$, so that a potential ignition source would be present in the explosion-endangered region.

Figure 5:
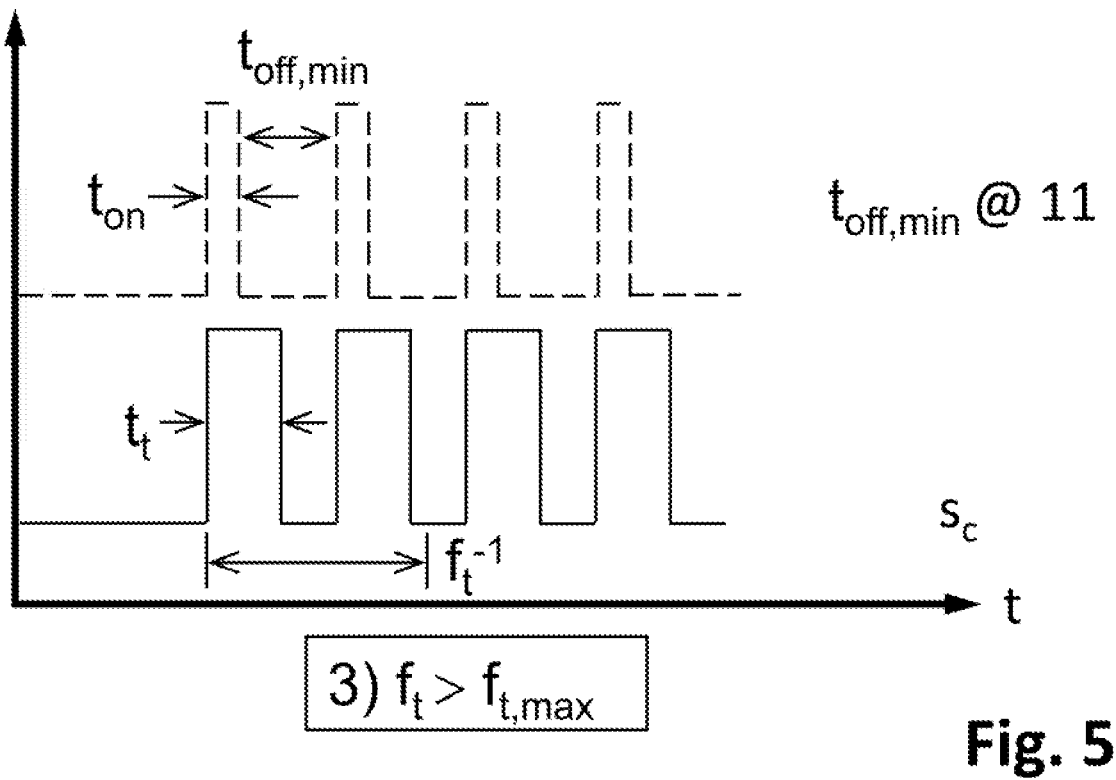
FIG. 5 shows a clocked power limiting in the case of a defective rectangular signal having a clocking frequency that is too high.

FIG. 5 shows that the safety circuit 1 of FIG. 2 also limits the power $P_e$ in the case of such a defective control signal $s_c$. The limiting is successful, in that the switch 11 of the safety circuit 1 separates the input path 4 from the superordinated unit 5, in this case, with at least a minimum off time $t_{off,min}$.

The switch 11 is, in this case, indeed, always still clocked with the clocking frequency $f_t$ of the control signal $s_c$. With rising clocking frequency, however, the on time $t_{on}$ lessens increasingly (toward the extreme case $t_{on}=0$), because of the minimum off time $t_{off,min}$, which remains constant, whereby the transferred power is, in turn, limited:

$$P_e = P_{on}(1 - f_t * t_{off,min})$$

With reference to the safety circuit 1 shown in FIG. 2, the minimum off time $t_{off,min}$ results, in turn, from the arrangement of the capacitor 14 within the safety circuit 1: In the case, in which the clocking frequency $f_t$ of the control signal $s_c$ is higher than the maximum clocking frequency $f_{t,max}$, the capacitor 14 is no longer completely discharged. In this way, the potential on the second connection 142 of the capacitor 14, or on the first input 131 of the amplifier 13 exceeds the limit voltage $V_T$ prematurely after switching of the transistor 12. The maximum clocking frequency $f_{t,max}$ results, in this case, from the time constant $((R_1+R_2)*C)$ of the capacitor 14.

Figure 6:
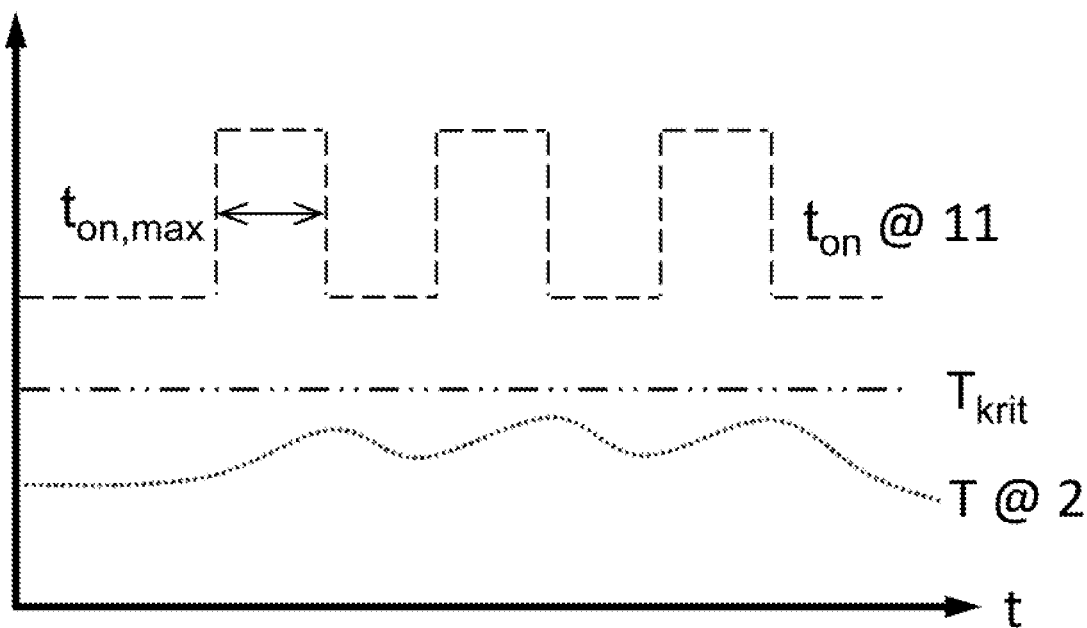
FIG. 6 shows a temperature development of the electrical component to be made safe in the case of limiting of power consumption by the safety circuit.

FIG. 6 shows schematically how the clocked limiting of power $P_e$ affects the temperature of the electrical component 2: By clocking with, at most, the maximum on time $t_{on,max}$, or with the minimum off time $t_{off,min}$ (to the extent that the maximum clocking frequency $f_{t,max}$ is exceeded), the electrical component 2 cools during the time when the safety circuit 1 has separated the signal input 4 from the superordinated unit 5. In this way, the temperature of the electrical component 2 always remains below the critical temperature $T_{krit}$, above which the component 2 ignite could the atmosphere in an explosion-endangered region.

The invention claimed is:

1. A method for a safe limiting of a consumption of electrical power in an electrical component of a field device, wherein the electrical component receives the electrical power via an electrical input path from a superordinated unit, the method comprising:
    controlling the consumption of the electrical power by separating the electrical input path from the superordinated unit by a safety circuit according to a predetermined clocking, wherein the clocking is controlled by a control signal sent to the safety circuit;
    in the case of no control signal, durably separating the electrical input path from the superordinated unit by the safety circuit; and
    in the case of a defective control signal, limiting the electrical power by the safety circuit by separating the input path from the superordinated unit for at least a predefined minimum off time, wherein the control signal is considered defective when it exceeds a predefined maximum clocking frequency and/or a predefined maximum on time.

2. The method as claimed in claim 1, wherein the control signal is a rectangular signal.

3. The method as claimed in claim 1, wherein the control signal is a periodic signal.

4. The method as claimed in claim 1, wherein the minimum off time is dimensioned such that a temperature of the electrical component remains below a critical temperature, above which an atmosphere in an explosion-endangered region can be ignited.

5. The method as claimed in claim 1, wherein the control signal is produced by the superordinated unit.

6. A safety circuit for a safe limiting of consumption of electrical power in an electrical component of a field device, wherein the electrical component receives the electrical power via an electrical input path from a superordinated unit, comprising:
    at least one switch arranged in the electrical input path for clocked separating of the input path from the superordinated unit;
    a signal input for a control signal; and
    a control circuit configured to control the at least one switch such that the at least one switch:
        separates the input path from the superordinated unit as a function of the control signal according to a predetermined clocking;
        in the case of no control signal, durably separates the electrical input path from the superordinated unit; and
        in the case of a defective control signal, limits the electrical power by separating the input path from the superordinated unit for at least a predefined minimum off time,
    wherein a superordinated unit is provided for producing the control signal.

7. The safety circuit as claimed in claim 6, wherein the switch and/or the signal input are/is implemented as one or more transistors.

8. The safety circuit as claimed in claim 7, wherein the control circuit includes:
    an amplifier connected as a comparator and having a first input for the control signal and an output via which the switch is controlled; and
    at least one capacitor,
    wherein the at least one capacitor is sized and connected between the signal input and the first input such that the minimum off time is dependent on the capacitance of the at least one capacitor.

* * * * *